T. H. GAWLEY.
MEANS FOR OVERCOMING FLANGE FRICTION.
APPLICATION FILED APR. 12, 1912.
1,051,214.
Patented Jan. 21, 1913.
2 SHEETS—SHEET 2.
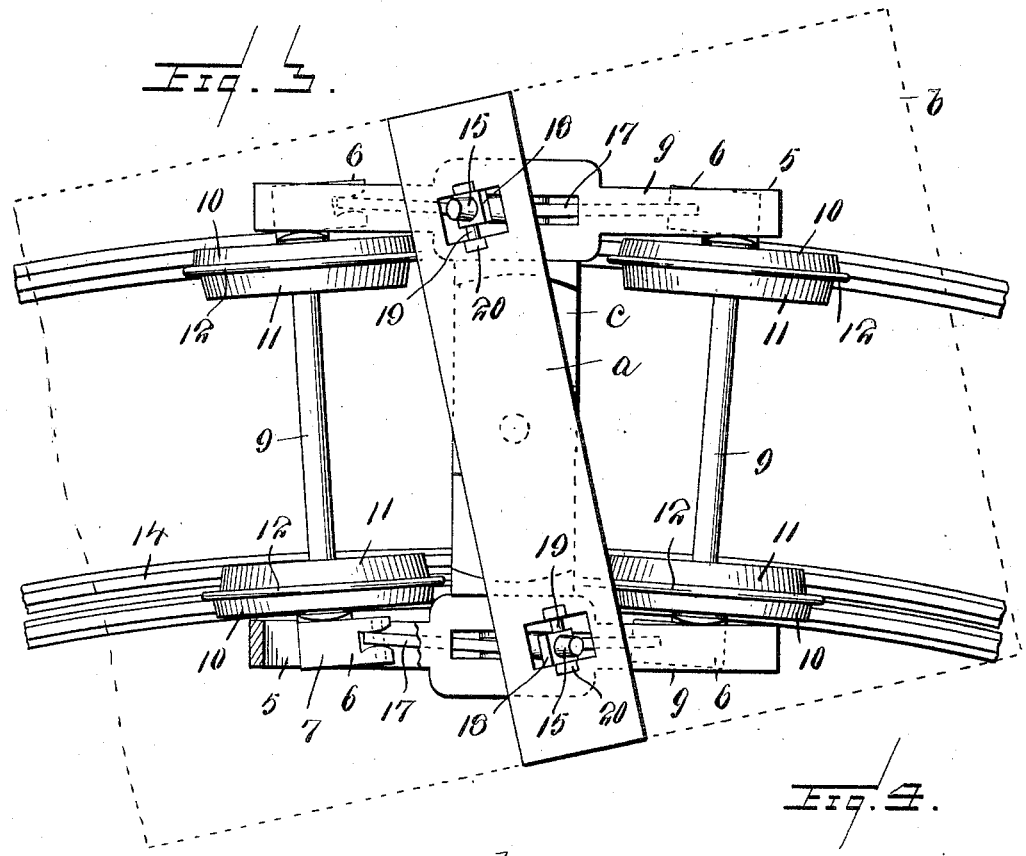
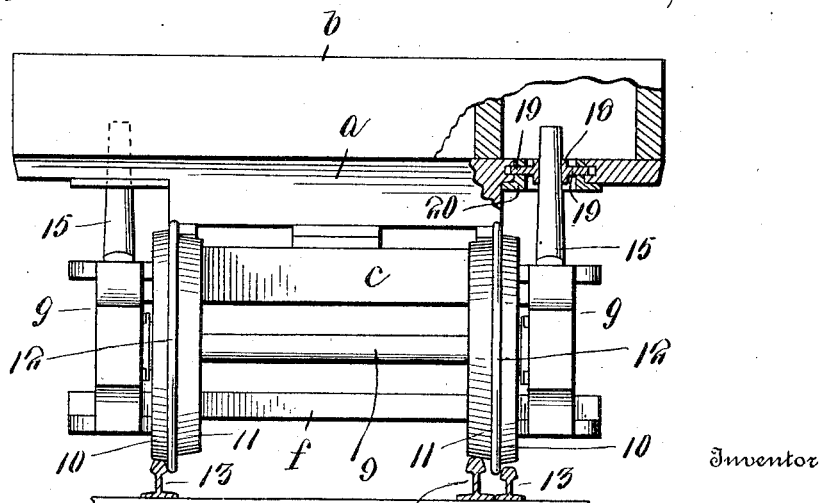
Witnesses
E. P. Ruppert
John A. Donegan
Inventor
Thomas H. Gawley
By Victor J. Evans
Attorney

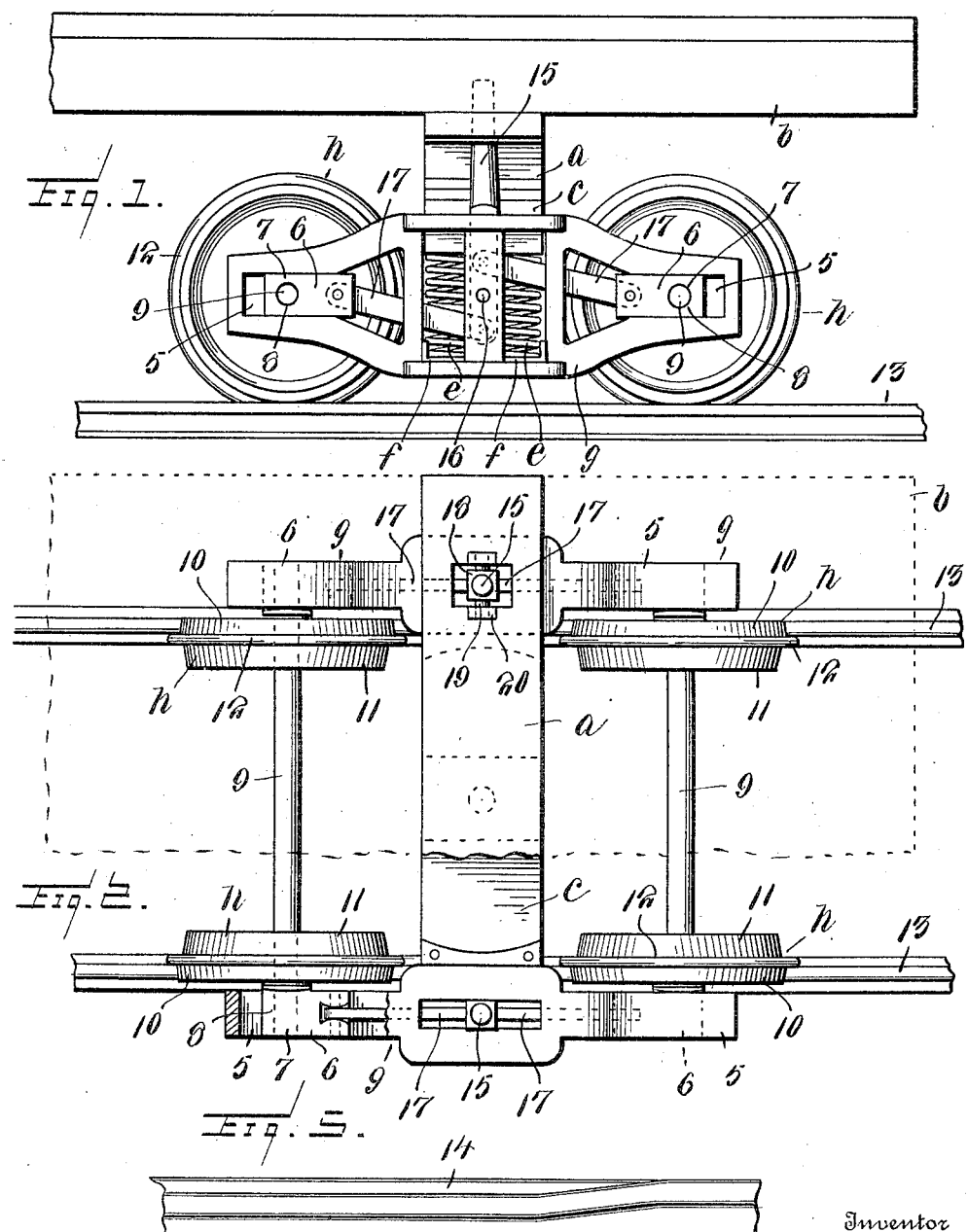

UNITED STATES PATENT OFFICE.

THOMAS HECTOR GAWLEY, OF NEW ORLEANS, LOUISIANA, ASSIGNOR OF ONE-FOURTH TO WILLIAM H. BYRNES, JR., AND ONE-FOURTH TO EDWARD C. BYRNES, OF NEW ORLEANS, LOUISIANA.

MEANS FOR OVERCOMING FLANGE FRICTION.

1,051,214.  Specification of Letters Patent.  Patented Jan. 21, 1913.

Application filed April 12, 1912. Serial No. 690,320.

*To all whom it may concern:*

Be it known that I, THOMAS H. GAWLEY, a citizen of the United States, residing at New Orleans, in the parish of Orleans and State of Louisiana, have invented new and useful Improvements in Means for Overcoming Flange Friction, of which the following is a specification.

The general object of the invention is to eliminate the flange friction and the sliding friction incident to the travel of car wheels upon a curved track; and to this end the invention consists in certain improved constructions, arrangements and combinations of devices, which will be fully described hereinafter, and then pointed out in the claim.

Other objects will appear and be better understood from that embodiment of my invention of which the following is a specification, reference being had to the accompanying drawings forming part hereof, in which:

Figure 1 is a side elevation of the invention. Fig. 2 is a plan partly in section of the same. Fig. 3 is a plan showing the position of the device on a curved track constructed in accordance with the invention. Fig. 4 is an end elevation partly in section of the parts shown in Fig. 3. Fig. 5 is a detail side elevation of one side of the track.

In order that the application of the truck forming one part of the subject matter of the invention, may be understood, I have shown this truck suitably connected such as by a bolster *a* to a well-known form of car body *b*. The bolster *a* of the car rests upon the truck bolster *c* which is supported by the springs *e—e* carried by the cross pieces *f—f* which connect the sides *g—g* of the truck.

The guides 5—5 in the opposite end portions of the sides *g—g* of the trucks, contain the cross heads 6—6 which are adapted to slide in the guides and which are formed of such metal as will render them capable of withstanding wear in sliding in the guides 5—5. The cross heads are provided with suitable boxings 7—7 for the journals 8—8 of the wheel axles 9—9.

The wheels *h—h* are formed with outer cone-shaped tread surfaces 10 and correspondingly shaped inner tread surfaces 11 less in circumference than the surfaces 10. The surfaces 10 and 11 of each wheel, are divided by a flange 12. The circumference of the surface 10 of each wheel is the same as that of an ordinary car wheel of corresponding size and as shown in Figs. 1 and 2, these surfaces bear on the track rails 13—13 when the car is passing over a straight track.

As shown in the drawings the ordinary form of rail is employed in connection with my invention and where the track is straight the rails thereof are of uniform height but on curves as shown in Figs. 3 and 4, a rail 14 is arranged adjacent to the inner or shorter side of the curve and conforms in curvature to the adjacent side of the said curve. This rail 14, however, is of greater height than the adjacent track rail, in fact the difference in height between the said rails corresponds to the difference in circumference between the tread surfaces 10 and 11 and this, of course, for the purpose of maintaining the parts as though the tread surfaces 10—10 or 11—11 alone bore on the track. Now in rounding curves with the ordinary car wheels of corresponding diameter, it is well-known that considerably more power is required to pull the cars than on a straight track and this is especially true when the trucks are provided at their opposite ends with car wheels of corresponding diameters. Now this inability of the wheels to travel on a curve with the same facility as on a straight track, is due to the friction of the wheel flanges on the rails and the sluing or transverse movement of the wheels with respect to the rails which results from having the axle bearings immovable and thereby preventing their conforming to the radii of the track rails and also preventing the inner wheels from turning with the same surface speeds as the wheels on the outer side of the curve. By having the wheel axles mounted as shown and previously described, it is evident that on rounding a curve with the track rails arranged as shown in Fig. 3 the axles 9—9 will incline toward each other as shown in the said figure, and the tread surfaces 11 of the wheels on the inner side of the curve will roll on the higher track rail 14 and thus the said wheels will roll on the curve as easily as on a straight track, owing to the difference in speed between the active tread surfaces or those bearing on the track.

The pins 16 one of which is shown in Fig. 1, are arranged on the sides g—g and support the restoring levers 15—15 which are connected to the cross heads by the links 17—17 and are slidingly fitted in sleeves 18 one of which is shown in Fig. 4. Each sleeve 18 has trunnions 19—19 which turn and slide longitudinally in a bushing 20 suitably secured in the bottom of the car body b. When the wheels move from the curve as shown in Fig. 3, onto the straight track the car body upon turning into a position parallel with the trucks, consequently moves the restoring levers 15 to their normal positions as shown in Figs. 1 and 2, and thus prevents any tendency of the axles to incline as shown in Fig. 3 and holds them locked until the wheels roll upon the next curve.

Although I have shown and described one embodiment of my invention it is to be understood that I am not to be limited to the specific construction and arrangement of parts herein shown, since various changes may be made, within the scope of the appended claim without departing from the spirit or sacrificing any of the advantages of the invention.

What is claimed as new is:

In a railway car, the combination of sleeve members pivotally connected to the body of the car, a truck having guides in its opposite sides, cross heads mounted in the guides, wheel axles journaled in the cross heads, and restoring levers slidingly fitted in the sleeve members and connected with the cross heads.

In testimony whereof I affix my signature in presence of two witnesses.

THOMAS HECTOR GAWLEY.

Witnesses:
EDUARD C. BYRNES,
GEORGE SCHMITT.

---

Copies of this patent may be obtained for five cents each, by addressing the "Commissioner of Patents, Washington, D. C."